US012408105B2

(12) United States Patent
Gidvani et al.

(10) Patent No.: US 12,408,105 B2
(45) Date of Patent: Sep. 2, 2025

(54) 6 GHZ NON-PSC AP DISCOVERY

(71) Applicant: Samsung Electronics Co., Ltd., Suwon-si (KR)

(72) Inventors: Ravi Gidvani, Fremont, CA (US); Shailender Karmuchi, Fremont, CA (US); Ashok Ranganath, Los Gatos, CA (US); Krunal Soni, Fremont, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 544 days.

(21) Appl. No.: 17/845,915

(22) Filed: Jun. 21, 2022

(65) Prior Publication Data

US 2023/0041365 A1    Feb. 9, 2023

Related U.S. Application Data

(60) Provisional application No. 63/229,742, filed on Aug. 5, 2021.

(51) Int. Cl.
*H04W 48/16* (2009.01)
(52) U.S. Cl.
CPC ................................ *H04W 48/16* (2013.01)
(58) Field of Classification Search
CPC .............................. H04W 48/16; H04W 48/08

USPC .............................................................. 455/434
See application file for complete search history.

(56) References Cited

U.S. PATENT DOCUMENTS

| 7,016,684 | B2 * | 3/2006 | Cave | H04W 36/06 |
| | | | | 455/450 |
| 9,826,473 | B2 * | 11/2017 | Lee | H04W 72/52 |
| 2008/0075035 | A1 * | 3/2008 | Eichenberger | H04W 36/0085 |
| | | | | 370/328 |
| 2009/0028120 | A1 * | 1/2009 | Lee | H04W 48/16 |
| | | | | 370/338 |
| 2015/0245285 | A1 * | 8/2015 | Kwon | H04W 76/19 |
| | | | | 370/254 |
| 2022/0330136 | A1 * | 10/2022 | Siraj | H04W 48/12 |

* cited by examiner

*Primary Examiner* — Qutbuddin Ghulamali
(74) *Attorney, Agent, or Firm* — Lewis Roca Rothgerber Christie LLP

(57) ABSTRACT

A system and method for the discovery of Access Point Stations operating on non-Preferred Scanning Channels. In some embodiments, the method includes: receiving, by a non-Access Point Station (non-AP STA), from a first Access Point Station (AP STA), in a transmission on a first channel, a Reduced Neighbor Report (RNR); and determining, by the non-AP STA, from the RNR, that a second AP STA is operating on a second channel, the first channel being a Preferred Scanning Channel (PSC), and the second channel being a non-PSC channel.

20 Claims, 3 Drawing Sheets

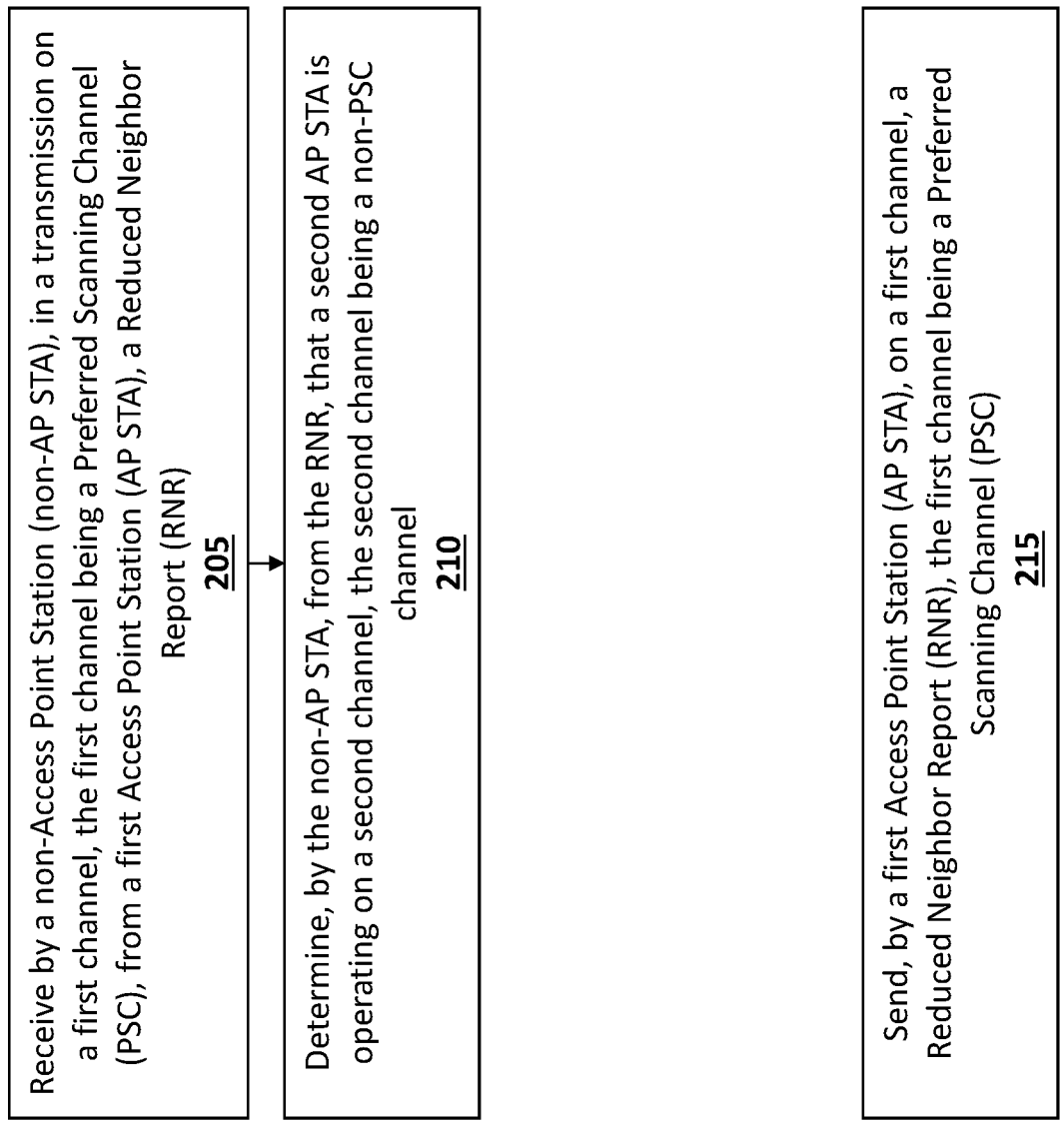

6 GHZ NON-PSC AP DISCOVERY

CROSS-REFERENCE TO RELATED APPLICATION(S)

The present application claims priority to and the benefit of U.S. Provisional Application No. 63/229,742, filed Aug. 5, 2021, entitled "6 GHz Non-PSC APs Discovery", the entire content of which is incorporated herein by reference.

FIELD

One or more aspects of embodiments according to the present disclosure relate to wireless communications, and more particularly to a system and method for the discovery of Access Point Stations (APs) operating on non-Preferred Scanning Channels (non-PSC channels).

BACKGROUND

A WiFi non-Access Point Station (non-AP STA, or simply STA) may, when attempting to connect to a 6 GHz channel, obtain, from an AP, as part of a Reduced Neighbor Report (RNR) received over a 2.4 GHz channel or over a 5 GHz channel, a Service Set Identifier (SSID) or Basic Service Set Identifier (BSSID) that it may use to connect to a Non-PSC channel of the AP. Some APs, however, may not support 2.4 GHz channels or 5 GHz channels.

It is with respect to this general technical environment that aspects of the present disclosure are related.

SUMMARY

According to an embodiment of the present disclosure, there is provided a method, including: receiving, by a non-Access Point Station (non-AP STA), from a first Access Point Station (AP STA), in a transmission on a first channel, a Reduced Neighbor Report (RNR); and determining, by the non-AP STA, from the RNR, that a second AP STA is operating on a second channel, the first channel being a Preferred Scanning Channel (PSC), and the second channel being a non-PSC channel.

In some embodiments, the method further includes scanning, by the non-AP STA, the second channel.

In some embodiments, the method further includes sending, by the non-AP STA, a probe request to the second AP STA on the second channel.

In some embodiments, the receiving of the RNR includes receiving, on the first channel, from the first AP STA, a beacon including the RNR.

In some embodiments, the receiving of the RNR includes receiving, on the first channel, from the first AP STA, a Fast Initial Link Setup (FILS) including the RNR.

In some embodiments, the receiving of the RNR includes receiving, on the first channel, from the first AP STA, an unsolicited probe response including the RNR.

According to an embodiment of the present disclosure, there is provided a method, including: sending, by a first Access Point Station (AP STA), on a first channel, a Reduced Neighbor Report (RNR), the first channel being a Preferred Scanning Channel (PSC), the RNR identifying a second AP STA operating on a second channel, the second channel being a non-PSC channel.

In some embodiments, the first AP STA is a non-2.4 GHz, non-5 GHz AP STA.

In some embodiments, the second AP STA is a non-2.4 GHz, non-5 GHz AP STA.

In some embodiments, the sending of the RNR includes sending, by the first AP STA, a beacon including the RNR.

In some embodiments, the sending of the RNR includes sending, by the first AP STA, a Fast Initial Link Setup (FILS) including the RNR.

In some embodiments, the sending of the RNR includes sending, by the first AP STA, an unsolicited probe response including the RNR.

In some embodiments, the method further includes receiving, by the first AP STA, information from a central controller, the information identifying the second AP STA.

In some embodiments, the information includes a Service Set Identifier (SSID) of the second AP STA or a Basic Service Set Identifier (BSSID) of the second AP STA.

In some embodiments, the method further includes receiving, by the first AP STA, information from a central controller, the information identifying the first channel.

According to an embodiment of the present disclosure, there is provided a system, including: a first Access Point Station (AP STA); a second AP STA; and a central controller, the central controller being configured to: configure the first AP STA to operate on a first channel, the first channel being a Preferred Scanning Channel (PSC); configure the second AP STA to operate on a second channel, the second channel being a non-PSC channel; and to inform the first AP STA of the configuration of the second AP STA.

In some embodiments, the first AP STA is configured to: send, on the first channel, a Reduced Neighbor Report (RNR), the RNR identifying the second AP STA.

In some embodiments, the sending of the RNR includes sending by the first AP STA, a beacon including the RNR.

In some embodiments, the sending of the RNR includes sending by the first AP STA, a Fast Initial Link Setup (FILS) including the RNR.

In some embodiments, the sending of the RNR includes sending by the first AP STA, an unsolicited probe response including the RNR.

BRIEF DESCRIPTION OF THE DRAWINGS

These and other features and advantages of the present disclosure will be appreciated and understood with reference to the specification, claims, and appended drawings wherein:

FIG. 2A is a flow chart, according to an embodiment of the present disclosure;

FIG. 2B is a flow chart, according to an embodiment of the present disclosure.

DETAILED DESCRIPTION

Figure 1:
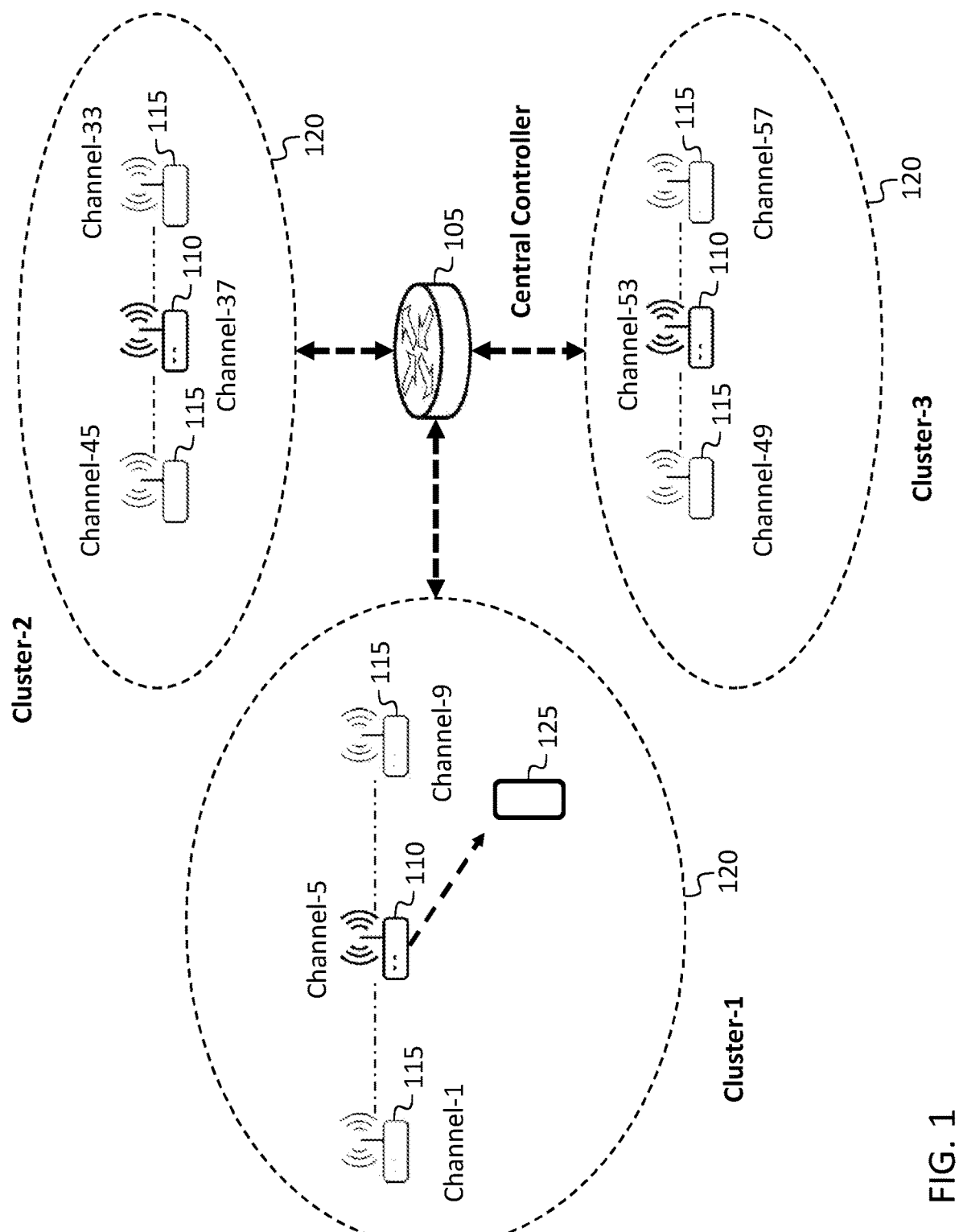
FIG. 1 is a block diagram of a wireless system, according to an embodiment of the present disclosure.

The detailed description set forth below in connection with the appended drawings is intended as a description of exemplary embodiments of a system and method for the discovery of Access Point Stations (AP STAs or simply APs) operating on non-Preferred Scanning Channels (non-PSCs or non-PSC channels) provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In the current WiFi standard, 802.11ax (WiFi-6), it is recommended that STAs perform 6 GHz in-band discovery on non-PSC channels. Doing so is not mandatory, however, and generally APs may transmit beacons on PSC channels, making it unnecessary for a STA to scan non-PSC channels. As used herein, a "PSC channel" is a Preferred Scanning Channel (PSC), and a "non-PSC channel" is a channel in the 6 GHz WiFi band that is not a PSC channel. A STA may obtain information (e.g., a channel number and an SSID or a BSSID) for connecting to a non-PSC channel from a 2.4 GHz channel of the AP or from a 5 GHz channel of the AP. In some circumstances, however, it may be advantageous for some APs to transmit beacons on non-PSC channels, such as in a crowded environment (such as a stadium), in which a large number of STAs may be interacting with a large number of APs. Moreover, in some such situations, some or all of the APs may be non-2.4 GHz, non-5 GHz APs, i.e., they may be APs that are not capable of operating in the 2.4 GHz or 5 GHz bands. In such a situation, requiring STAs to scan a total of 59 6 GHz channels, at e.g., 100 ms dwell time, may result in a total scanning time of nearly 6 seconds, which may consume significant power in the STA and may be burdensome for users.

As such, in some embodiments, a first AP may operate (e.g., send beacons, Fast Initial Link Setup (FILS) transmissions (e.g., FILS discovery frames), and unsolicited probe responses) on a first channel which is a PSC channel. The first AP may be aware, as discussed in further detail below, of a plurality of second APs in the vicinity of the first AP, each operating (e.g., sending beacons, FILS transmissions, and unsolicited probe responses) on a respective non-PSC channel. The beacons, FILS transmissions, and unsolicited probe responses transmitted by the first AP may each include a Reduced Neighbor Report (RNR) which includes information about the second APs in the vicinity of the first AP, including for example the SSID of each second AP, the BSSID of each second AP, and the non-PSC channel on which each second AP is operating. As used herein, when an AP is described as "operating" on a certain channel, it means the AP transmits beacons or FILS transmissions or unsolicited probe responses on the channel. When a STA scans the first channel, it may receive the RNR, and it may then switch to one of the second APs, e.g., by scanning the second AP for a beacon, or by sending, to the second AP, a probe request, to initiate the making of a connection to the second AP.

Referring to FIG. 1, in some embodiments a central controller 105 is connected to each of a plurality of APs including a plurality of first APs 110, each of which operates on a PSC channel, and a plurality of second APs 115, each of which operates on a non-PSC channel. The APs may be organized (e.g., grouped) into clusters 120, depending on their physical locations. For example, each of the second APs 115 may be in the vicinity of a respective one of the first APs 110, so that a STA 125 that receives good signal strength from one of the first APs 110 is likely to also receive acceptable signal strength from each of the second APs 115 in the same cluster 120. In FIG. 1, each of the first APs 110 and each of the second APs 115 is labeled with the number of the channel on which it operates, with, e.g., the cluster 120 on the left of FIG. 1 including a first AP 110 operating on the PSC channel 5, and the two second APs 115 operating on the non-PSC channels 1 and 9 respectively.

The central controller 105 may be connected (e.g., via a wired ethernet connection) to each of the first APs 110 and to each of the second APs 115. It may also be aware of the location of each of the first APs 110 and of the location of each of the second APs 115 (e.g., as a result of information programmed into it at the time the first APs 110 and the second APs 115 were installed, or as a result of information returned to it by each of the first APs 110 and by each of the second APs 115, each of which may include a location-determining (e.g., Global Positioning System (GPS)) circuit). The central controller may (e.g., (i) automatically, using a suitable grouping algorithm, or (ii) based on configuration information, e.g., stored in a database by an operator during installation of the APs) group the first APs 110 and the second APs 115 into clusters based on their locations, and determine which APs will operate as first APs 110 and which APs will operate as second APs 115. The central controller 105 may then, e.g., at startup, configure each of the second APs 115, e.g., it may send to each of the second APs 115 instructions regarding which channel to operate on. The central controller 105 may also configure each of the first APs 110, e.g. it may send to each of the first APs 110 information regarding the configuration of the second APs 115 in the same cluster 120. For each of the second APs 115, this information may include the channel number that the second AP 115 is operating on, the SSID of the second AP 115, and the BSSID (which may be the Media Access Control (MAC) ID) of the second APs 115. In some embodiments the central controller 105 also resends the configuration to an AP when whenever the AP is reset or power-cycled.

Each of the first APs 110 may then begin transmitting RNRs in one or more of (i) the beacons transmitted by the first AP 110, (ii) FILS transmissions (e.g., FILS discovery frames), and (iii) unsolicited probe responses. Each RNR may include configuration information for one or more of the second APs 115 in the same cluster 120 as the first AP 110 (e.g., the channel number that the second AP 115 is operating on, the SSID of the second AP 115, and the BSSID of the second AP 115).

When a STA 125 attempts to connect to an AP, it may first scan a PSC channel (e.g., channel 5, as illustrated in FIG. 1) and, as a result, receive an RNR (e.g., it may receive a beacon comprising the RNR, or a FILS transmission comprising the RNR, or an unsolicited probe response comprising the RNR). The RNR may include, as mentioned above, configuration information for connecting to one or more second APs 115 in the cluster 120. If a plurality of SSIDs are included in the configurations (e.g., if two of the second APs 115 have different SSIDs), the STA 125 may display the available SSIDs to the user and allow the user to select an SSID to be used. If only one second AP 115 is using the SSID selected by the user, the STA 125 may then (i) scan the channel used by the second AP 115 for a beacon, or (ii) send a probe request to the second AP 115, and proceed with the association process so as to establish a link with the AP.

In some embodiments, because the (non-2.4 GHz, non-5 GHz) first AP 110 advertises the RNR of the (non-2.4 GHz, non-5 GHz) second APs 115 in the vicinity of the first AP 110 (e.g., within same cluster as the first AP 110), it is not necessary for the second APs 115 to send unsolicited probe responses or FILS transmissions, as their existence has already been advertised through the RNRs of the first AP 110. This may free up a significant amount of channel capacity, by reducing unnecessary unsolicited probe responses or FILS transmissions.

In some circumstances it may be advantageous for multiple APs (e.g., all of the first APs 110 and all of the second APs 115) to use the same SSID; in this case the user may be presented with only one option, and the STA 125 may use a suitable algorithm to select the first AP 110 or the second AP 115 to be used. The algorithm may, for example, select the AP with the greatest signal level, the AP with the greatest bandwidth, the AP with the greatest capabilities, or, e.g., the AP for which a weighted average of measures of these characteristics is greatest. In some embodiments, each cluster includes exactly one of the first APs 110. In some embodiments the clusters may overlap, e.g., a second AP 115 may be a member of more than one cluster (e.g., if it is approximately half-way between two of the first APs 110). In some embodiments, some or all of the APs are virtual APs (each of which may share hardware (e.g., an enclosure and a power supply) with other virtual APs).

FIG. 2A is a flowchart of a method, according to some embodiments. In some embodiments, the method includes receiving, at 205, by a non-Access Point Station (non-AP STA), in a transmission on a first channel, the first channel being a Preferred Scanning Channel (PSC), from a first Access Point Station (AP STA), a Reduced Neighbor Report (RNR); and determining, at 210, by the non-AP STA, from the RNR, that a second AP STA is operating on a second channel, the second channel being a non-PSC channel. FIG. 2B is a flowchart of a method, according to some embodiments. In some embodiments, the method includes sending, at 215, by a first Access Point Station (AP STA), on a first channel, a Reduced Neighbor Report (RNR), the first channel being a Preferred Scanning Channel (PSC), the RNR identifying a second AP STA operating on a second channel, the second channel being a non-PSC channel.

Figure 2C:
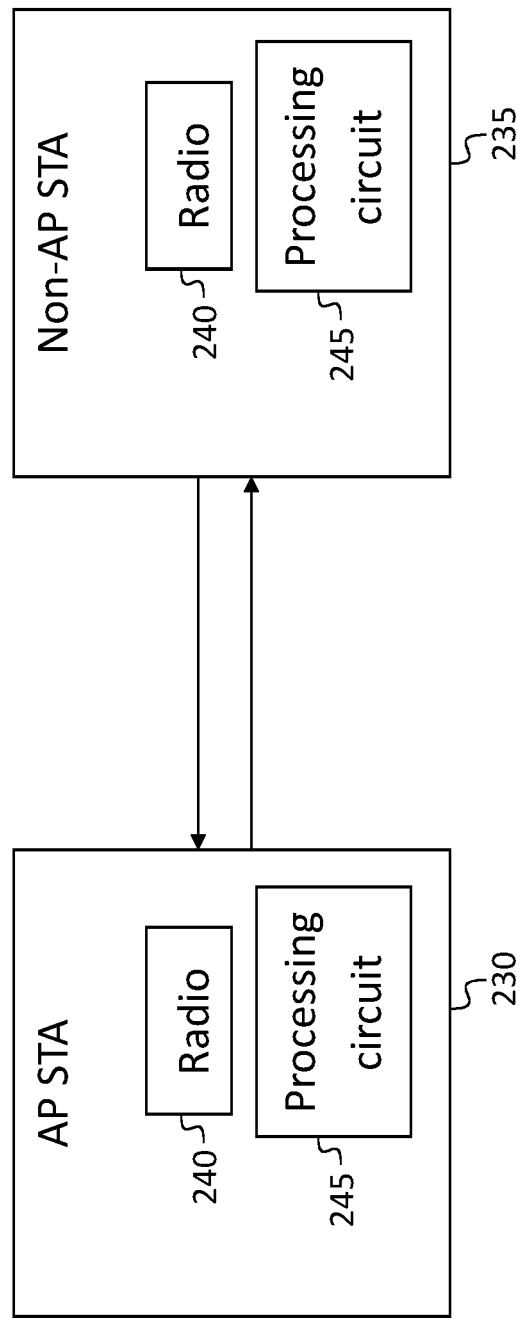
FIG. 2C is a block diagram of a portion of a wireless system, according to an embodiment of the present disclosure.

FIG. 2C shows a system including an AP STA 230 and a non-AP STA 235, in communication with each other. Each of the AP STA and the non-AP STA may include a respective radio 240 and a respective processing circuit (or a means for processing) 245, which may perform various methods disclosed herein, e.g., the processing circuit 245 of the non-AP STA 230 may perform (using the radio 240 of the AP STA 230) the method illustrated in FIG. 2A, and the AP STA may perform the method illustrated in FIG. 2B. In other examples, the processing circuit 245 of the non-AP STA 235 may receive, via the radio 240 of the non-AP STA 235, transmissions from the AP STA 230, and the processing circuit 245 of the non-AP STA 235 may transmit, via the radio 240 of the non-AP STA 235, signals to the AP STA 230.

Although some examples are described herein in the context of PSC channels and non-PSC channels in the 6 GHz band, the present disclosure is not limited to such examples, and, for example, if future releases of the WiFi standard provide for PSC channels and non-PSC channels in other bands (e.g., in a 7 GHz band or a 10 GHz band), then the methods described herein may be practiced in such other bands to similar or identical effect.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the word "or" is inclusive, so that, for example, "A or B" means any one of (i) A, (ii) B, and (iii) A and B.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for the discovery of Access Point Stations operating on non-Preferred Scanning Channels have been specifically described and illustrated herein, many modifications and variations will be apparent to those skilled in the art. Accordingly, it is to be understood that a system and method for the discovery of Access Point Stations operating on non-Preferred Scanning Channels constructed according to principles of this disclosure may be embodied other than as specifically described herein. The invention is also defined in the following claims, and equivalents thereof.

What is claimed is:

1. A method, comprising:
    receiving, by a non-Access Point Station (non-AP STA), from a first Access Point (AP), in a transmission on a first channel, a Reduced Neighbor Report (RNR), wherein the RNR comprises network information of a plurality of second APs; and
    determining, based on the RNR, by the non-AP STA, that the plurality of second APs is operating on a second channel,
    the first channel being a Preferred Scanning Channel (PSC), and the second channel being a non-PSC channel.

2. The method of claim 1, further comprising scanning, by the non-AP STA, the second channel.

3. The method of claim 1, further comprising sending, by the non-AP STA, a probe request to the plurality of second APs on the second channel.

4. The method of claim 1, wherein the receiving of the RNR comprises
    receiving, on the first channel, from the first AP, a beacon comprising the RNR.

5. The method of claim 1, wherein the receiving of the RNR comprises receiving, on the first channel, from the first AP, a Fast Initial Link Setup (FILS) comprising the RNR.

6. The method of claim 1, wherein the receiving of the RNR comprises receiving, on the first channel, from the first AP, an unsolicited probe response comprising the RNR.

7. A method, comprising:
    sending, by a first Access Point (AP), on a first channel, a Reduced Neighbor Report (RNR), the first channel being a Preferred Scanning Channel (PSC), wherein the RNR comprises network information of a plurality of second APs,
    the RNR identifying the plurality of second APs operating on a second channel, the second channel being a non-PSC channel.

8. The method of claim 7, wherein the first AP is a non-2.4 GHZ, non-5 GHZ AP.

9. The method of claim 8, wherein each of the plurality of second APs is a non-2.4 GHZ, non-5 GHZ AP.

10. The method of claim 7, wherein the sending of the RNR comprises sending, by the first AP, a beacon comprising the RNR.

11. The method of claim 7, wherein the sending of the RNR comprises sending, by the first AP, a Fast Initial Link Setup (FILS) comprising the RNR.

12. The method of claim 7, wherein the sending of the RNR comprises sending, by the first AP, an unsolicited probe response comprising the RNR.

13. The method of claim 7, further comprising receiving, by the first AP, information from a central controller, the information identifying the plurality of second APs.

14. The method of claim 13, wherein the information includes a Service Set Identifier (SSID) of the plurality of second APs or a Basic Service Set Identifier (BSSID) of the plurality of second APs.

15. The method of claim 13, further comprising receiving, by the first AP, information from a central controller, the information identifying the first channel.

16. A system, comprising:
    a first Access Point (AP);
    a plurality of second APs; and
    a central controller,
    the central controller being configured to:
        configure the first AP to operate on a first channel, the first channel being a Preferred Scanning Channel (PSC);
        configure the plurality of second APs to operate on a second channel, the second channel being a non-PSC channel; and
        to inform the first AP of the configuration of the plurality of second APs.

17. The system of claim 16, wherein the first AP is configured to:
    send, on the first channel, a Reduced Neighbor Report (RNR),
    the RNR identifying the plurality of second APs.

18. The system of claim 16, wherein the sending of the RNR comprises sending by the first AP, a beacon comprising the RNR.

19. The system of claim 16, wherein the sending of the RNR comprises sending by the first AP, a Fast Initial Link Setup (FILS) comprising the RNR.

20. The system of claim 16, wherein the sending of the RNR comprises sending by the first AP, an unsolicited probe response comprising the RNR.

* * * * *